(12) United States Patent
Elsawi

(10) Patent No.: US 11,136,772 B2
(45) Date of Patent: Oct. 5, 2021

(54) SWIMMING POOL FILTRATION SYSTEM WITH MEANS TO SPRAY BACKWASH AWAY FROM THE SYSTEM

(71) Applicant: Montasser M. Elsawi, Saratoga Springs, NY (US)

(72) Inventor: Montasser M. Elsawi, Saratoga Springs, NY (US)

( * ) Notice: Subject to any disclaimer, the term of this patent is extended or adjusted under 35 U.S.C. 154(b) by 268 days.

(21) Appl. No.: 16/459,996

(22) Filed: Jul. 2, 2019

(65) Prior Publication Data

US 2019/0323250 A1 Oct. 24, 2019

Related U.S. Application Data

(62) Division of application No. 15/830,705, filed on Dec. 4, 2017, now Pat. No. 10,385,578.

(51) Int. Cl.
| | |
|---|---|
| *E04H 4/12* | (2006.01) |
| *C02F 1/00* | (2006.01) |
| *B01D 37/00* | (2006.01) |
| *C02F 103/42* | (2006.01) |
| *B01D 29/68* | (2006.01) |

(52) U.S. Cl.
CPC ........... *E04H 4/1218* (2013.01); *B01D 37/00* (2013.01); *C02F 1/001* (2013.01); *B01D 29/68* (2013.01); *C02F 2103/42* (2013.01); *C02F 2303/16* (2013.01)

(58) Field of Classification Search
None
See application file for complete search history.

(56) References Cited

U.S. PATENT DOCUMENTS

| | | | | |
|---|---|---|---|---|
| 656,043 | A * | 8/1900 | Paterson ............ | B01D 24/4636 210/108 |
| 2,347,092 | A | 4/1944 | Evans ................... | E04H 4/1209 210/167.14 |
| 2,979,733 | A | 4/1961 | Saint Clair .......... | E04H 4/1681 137/577.5 |
| 3,138,552 | A * | 6/1964 | Richards ............... | B01D 35/26 210/98 |
| 3,195,726 | A | 7/1965 | Saurenman .............. | E04H 4/12 137/597 |
| 3,207,312 | A | 9/1965 | Griswold ............ | B01D 24/105 137/625.21 |
| 3,365,064 | A | 1/1968 | Horan, Jr. ............ | B01D 29/668 210/167.13 |
| 3,581,895 | A | 6/1971 | Howard ................. | B01D 24/14 210/108 |
| 3,616,915 | A | 11/1971 | Whitlock ............... | B01D 37/04 210/108 |
| 3,670,893 | A * | 6/1972 | Seid ...................... | B01D 37/00 210/138 |

(Continued)

*Primary Examiner* — Robert J Popovics

(57) ABSTRACT

In one embodiment, a pool filter backwash assembly is described that comprises a pool filter extension configured to be connected to a backwash outlet of a pool filter and a backwash shower head configured to convert a backwash stream from the backwash outlet to a spray directed away from the pool filter. In some embodiments, the pool filter backwash assembly further comprises a backwash shower extension and an angled adapter. In addition, a method of backwashing a pool filter is described in which a pool filter backwash assembly is attached to a backwash outlet of a pool filter.

15 Claims, 8 Drawing Sheets

(56) References Cited

U.S. PATENT DOCUMENTS

| | | | | |
|---|---|---|---|---|
| 3,859,214 A | 1/1975 | Lang | B01D 29/15 | 210/167.14 |
| 3,910,500 A | 10/1975 | Hardison | A01G 25/02 | 239/310 |
| 4,105,555 A | 8/1978 | Pease | B01D 24/14 | 210/136 |
| 4,115,276 A | 9/1978 | Kelly | B01D 29/668 | 137/625.29 |
| 4,127,485 A | 11/1978 | Baker | B01D 24/4631 | 210/167.13 |
| 4,153,552 A | 5/1979 | Muther | B01D 37/02 | 210/108 |
| 4,194,975 A | 3/1980 | Baker | B01D 35/153 | 210/108 |
| 4,330,040 A * | 5/1982 | Ence | A62C 3/00 | 169/13 |
| 4,428,434 A * | 1/1984 | Gelaude | A62C 3/00 | 137/624.11 |
| 4,519,914 A | 5/1985 | Etani | B05B 7/04 | 210/167.11 |
| 4,530,120 A | 7/1985 | Etani | B05B 7/04 | 210/765 |
| 4,545,905 A * | 10/1985 | Poe | B01D 35/027 | 137/625.46 |
| 4,555,334 A | 11/1985 | Cohen | B01D 29/117 | 210/167.14 |
| 4,564,451 A | 1/1986 | Cohen | B01D 29/117 | 210/411 |
| 4,574,048 A | 3/1986 | van den Broek | B01D 29/114 | 210/136 |
| 4,652,369 A * | 3/1987 | DePolo | B01D 37/02 | 210/167.13 |
| 4,704,202 A | 11/1987 | Poyner | B01D 29/54 | 210/108 |
| 4,714,551 A * | 12/1987 | Bachhofer | B01D 24/4642 | 137/625.27 |
| 4,775,485 A | 10/1988 | Etani | B05B 7/04 | 210/696 |
| 5,125,458 A * | 6/1992 | Berman | A62C 37/36 | 169/13 |
| 5,366,021 A | 11/1994 | Coleman | A62C 3/00 | 169/13 |
| 5,367,723 A | 11/1994 | Pleva | E04H 4/12 | 137/428 |
| 5,505,844 A | 4/1996 | Porter | B01D 24/10 | 210/95 |
| 5,785,846 A | 7/1998 | Barnes | E04H 4/1272 | 210/167.12 |
| 5,931,233 A * | 8/1999 | La Bonte | A62C 2/08 | 169/5 |
| 6,605,211 B1 * | 8/2003 | Slopack | B01D 24/4631 | 210/167.12 |
| 6,685,826 B1 * | 2/2004 | James | C02F 3/06 | 210/150 |
| 6,878,293 B1 | 4/2005 | Portyrata | B01D 24/105 | 210/793 |
| 7,329,350 B2 * | 2/2008 | James | C02F 3/087 | 210/616 |
| 7,354,512 B1 | 4/2008 | Barbe | B01D 29/27 | 210/167.1 |
| 7,468,134 B2 | 12/2008 | Hoang | A01K 63/045 | 210/150 |
| 7,794,591 B2 * | 9/2010 | Nibler | C02F 1/004 | 210/167.12 |
| 7,815,796 B2 | 10/2010 | Nibler | B01D 29/114 | 210/167.12 |
| 7,951,293 B2 * | 5/2011 | Nibler | E04H 4/1209 | 210/167.11 |
| 8,137,545 B2 | 3/2012 | Nibler | C02F 1/001 | 210/167.12 |
| 8,173,011 B2 * | 5/2012 | Nibler | F28D 1/053 | 210/167.11 |
| 8,555,989 B1 | 10/2013 | Agajanian | A62C 31/28 | 169/13 |
| 8,893,814 B2 * | 11/2014 | Bui | E04D 13/00 | 169/45 |
| 8,945,379 B2 | 2/2015 | Brull | B01D 29/009 | 210/167.12 |
| 9,539,529 B2 | 1/2017 | Mullis | B01D 35/02 | |
| 9,816,282 B2 | 11/2017 | Chick | E04H 4/1245 | |
| 10,385,578 B2 * | 8/2019 | Elsawi | B01D 37/00 | |
| 10,888,806 B2 * | 1/2021 | Bloomfield | B01D 21/0012 | |
| 2006/0151366 A1 * | 7/2006 | Hoang | A01K 63/045 | 210/95 |
| 2009/0151961 A1 * | 6/2009 | Voorhees | A62C 35/58 | 169/13 |
| 2013/0020098 A1 * | 1/2013 | Bui | A62C 3/0214 | 169/16 |
| 2014/0001128 A1 | 1/2014 | Mullis | B01D 35/02 | 210/793 |
| 2014/0374127 A1 * | 12/2014 | Dalmau Rovira | A62C 3/02 | 169/48 |
| 2016/0250571 A1 * | 9/2016 | Bloomfield | B01D 24/4673 | 210/774 |
| 2019/0169869 A1 * | 6/2019 | Elsawi | B01D 37/00 | |
| 2019/0323250 A1 * | 10/2019 | Elsawi | B01D 37/00 | |

* cited by examiner

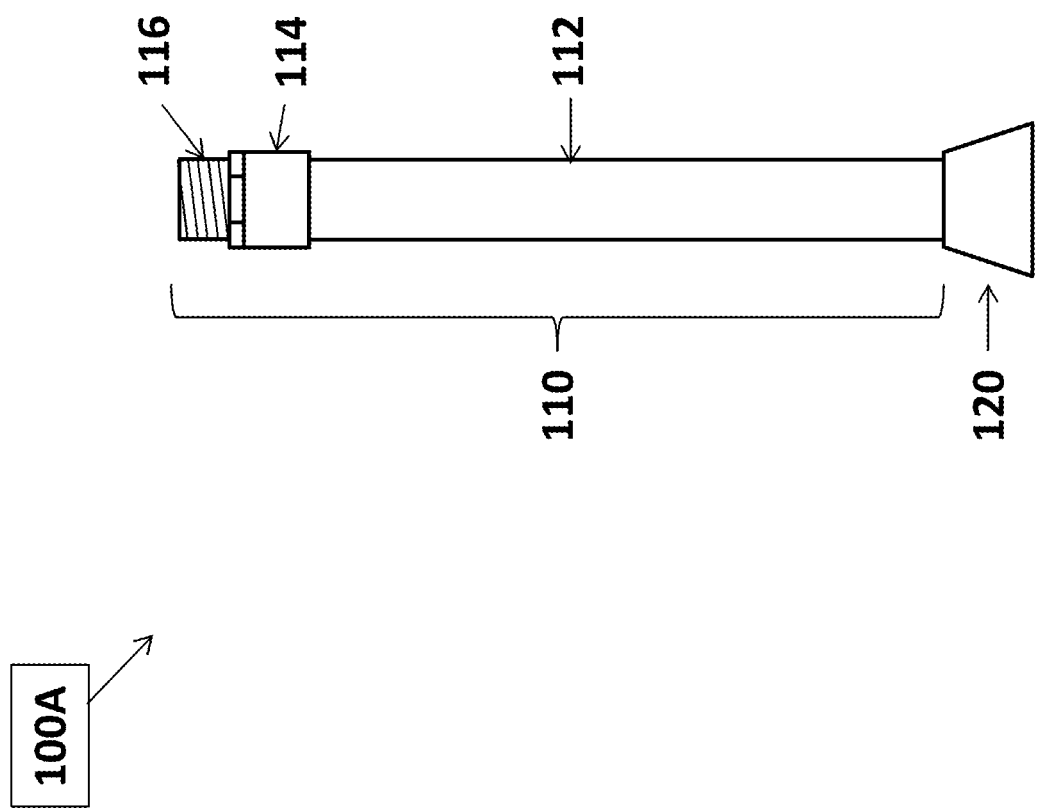

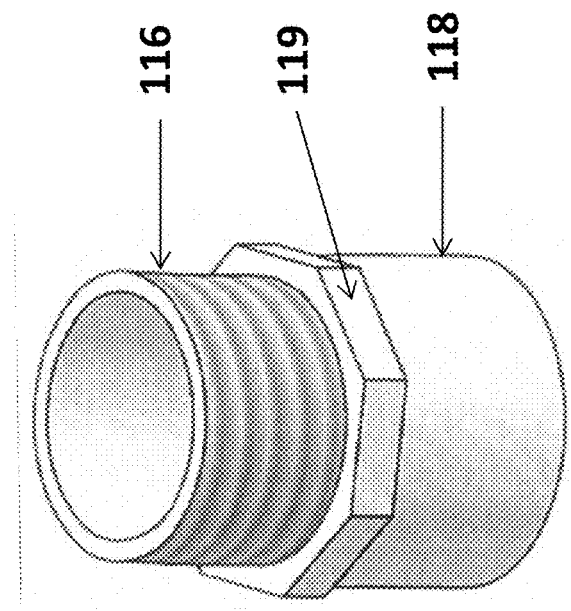
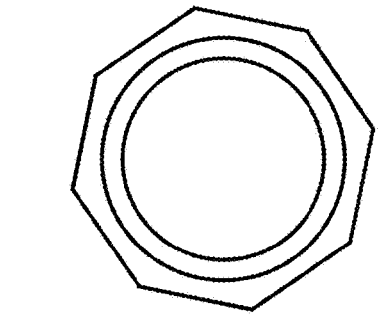
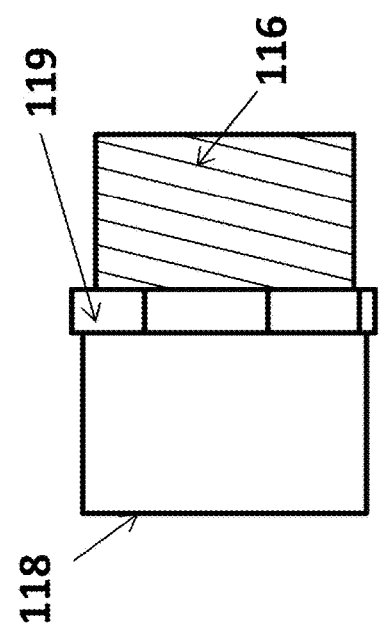
FIG. 3A
FIG. 3B
FIG. 3C
FIG. 3D

SWIMMING POOL FILTRATION SYSTEM WITH MEANS TO SPRAY BACKWASH AWAY FROM THE SYSTEM

RELATED APPLICATION

This application is a divisional application of U.S. patent application Ser. No. 15/830,705, filed Dec. 4, 2017, entitled POLYVINYL CHLORIDE CONDUIT FOR BACKWASHING POOL FILTERS, by Montasser M. Elsawi, the contents of which are incorporated herein by reference.

TECHNICAL FIELD

The present disclosure relates generally to techniques for backwashing a pool filter, and, more particularly, to a pool filter backwashing assembly.

BACKGROUND

According to the Association of Pool Spa Professionals, there are 10.4 million residential and 309,000 public swimming pools in the United States (Aug. 27, 2016). While swimming pools come in a variety of shapes and sizes, nearly all of them use a combination of filtration and chemical treatment in order to continually clean the contained large volume of water.

Some basic steps are recommended in order to maintain sparking clean, clear pool water. One such step is to pump water in a continuous cycle from the pool through a filter of a properly sized filtration system, which is then sent back into the pool. A pump acts as the center of the circulation system, moving water from the pool through the filter for removal of any dirt or debris prior to returning the water into the pool.

Backwashing is a vital part of the overall process and necessary to ensure that the filtering system operates properly. Backwashing is a method of reversing the flow of water through the filter, thereby flushing out contaminants from the filter. Typically, backwashing is accomplished by connecting a waste hose to an outlet of the filter and laying the hose out to a designated dump site near the pool. The direction of flow through the filter is then changed so that water flows in reverse through the filter and out the waste hose.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 1A-1B show an overhead view of an embodiment of the pool filter backwash assembly;

FIGS. 3A-3D show views of the pool filter connector used in various embodiments of the pool filter backwash assembly;

Figure 1B:
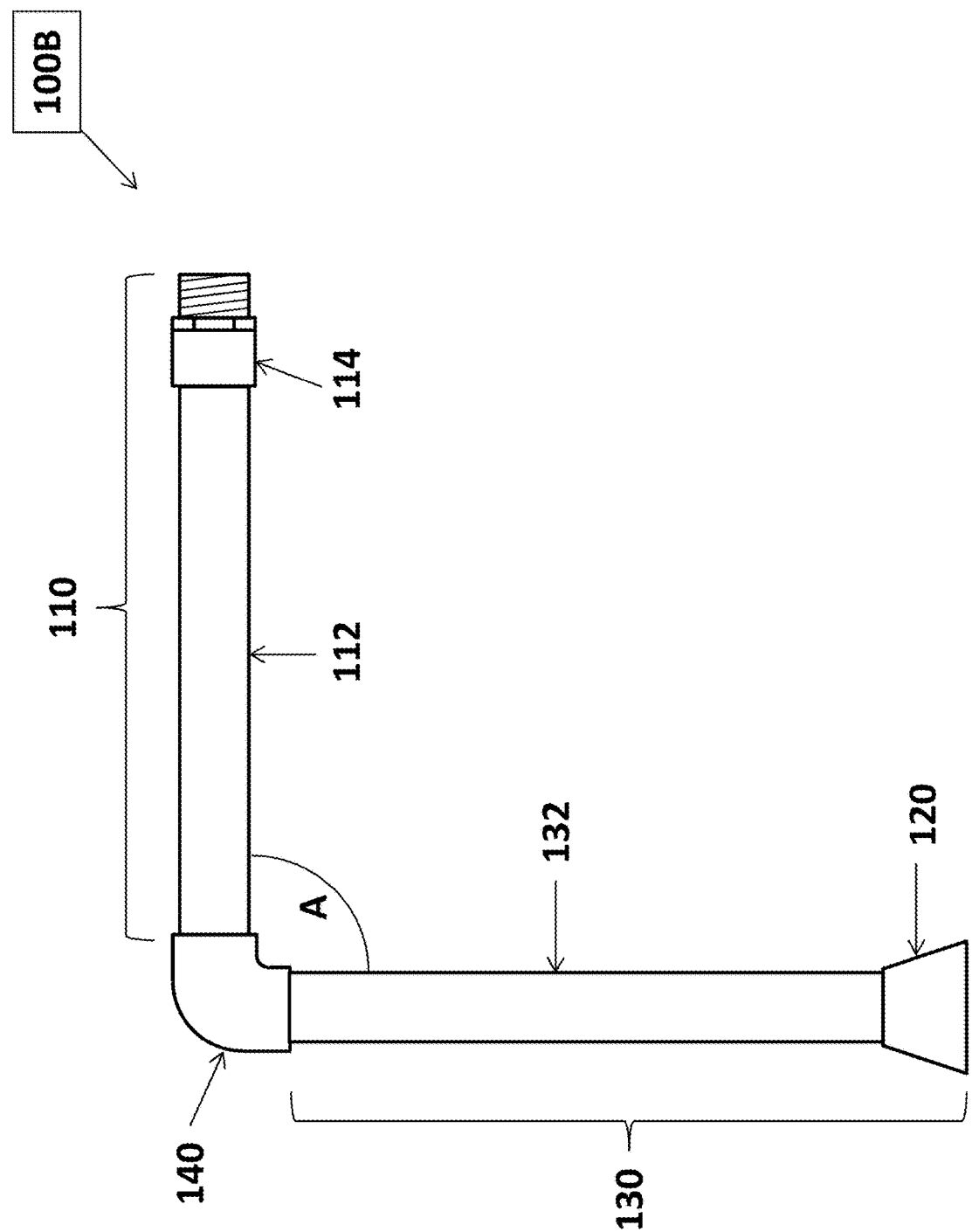

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

SUMMARY OF THE INVENTION

According to one or more embodiments of the present disclosure, a pool filter backwash assembly is described that comprises a pool filter extension configured to be connected to a backwash outlet of a pool filter and a backwash shower head configured to convert a backwash stream from the backwash outlet to a spray directed away from the pool filter. In some embodiments, the pool filter backwash assembly further comprises a backwash shower extension and an angled adapter. In particular, the pool filter extension may comprise a filter extender having a first end attached to a pool filter connecter, which is sized for the backwash outlet, and a second end attached to the angled adapter. In addition, the backwash shower extension may comprise a shower extender having a first end attached to the backwash shower head and a second end attached to the angled adapter. Specific embodiments of the pool filter shower backwash assembly are further described below.

In addition, according to embodiments of the present disclosure, a method of backwashing a pool filter is described in which a pool filter backwash assembly is attached to a backwash outlet of a pool filter. The pool filter backwash assembly may comprise a pool filter extension comprising a filter extender having a first end attached to a pool filter connector sized for the backwash outlet, and a second end attached to an angled adapter. The backwash shower extension may comprise a shower extender having a first end attached to a backwash shower head and a second end attached to the angled adapter. In some embodiments of the present method, a backwash stream is formed from the backwash outlet, which is converted, by the backwash shower head, to a spray directed away from the pool filter.

DETAILED DESCRIPTION

As discussed above, backwashing is an important part of the pool filtering process and is necessary to ensure that the filtering system operates properly. Backwashing reverses the flow of water through the filter, thereby flushing out contaminants from the filter. In general, a waste hose, which may be between 25 and 100 feet long, is connected to an outlet of the filter, such as with a clamp, and is laid out to direct the backwash flow to a designated dump site near the pool and filter, such as the user's lawn. However, the backwash stream is often forced out through the hose at a substantial pressure, causing the area around the exit of the hose to become flooded and eroded, often causing significant damage to the foundation of the lawn. Redirecting the flow to a new location only creates a new hole and adding to the lawn degradation.

In addition, backwash hoses in general can be difficult to maintain and manage, often becoming tangled, knotted, or kinked. A kink in the backwash hose during use creates additional pressure, which can cause the hose to rupture.

Furthermore, long hoses can become trip hazards or caught up in a lawn mower if accidentally left out, and can also be difficult to coil or fold for storage.

The techniques described herein provide for a pool filter backwash assembly that, when attached to the backwash outlet of a pool filter, converts a backwash stream from the pool filter into a spray that is directed away from the pool filter. In this way, when the pool filter is set to backwash, the resulting waste water stream is forced under pressure through the pool filter backwash assembly and dispersed gently as a water spray substantially evenly over a designated area of property (e.g., a user's lawn or garden). The angle and direction of the spray can be adjusted as needed at the filter, rather than at the wet designated dump area. In addition, the assembly can be readily disassembled for easy storage.

In more detail, the pool filter backwash assembly comprises a pool filter extension that is configured to be connected to the backwash outlet of the pool filter and a backwash shower head configured to convert a waste stream exiting from the backwash outlet into a spray that is directed away from the pool filter towards a designated dump location. Both the direction of the spray as well as the angle away from pool filter can be varied as desired depending, for example, on the configuration of the pool filter and the location available for the backwash spray, and, in some embodiments, can be adjustable as needed. Thus, for example, in one embodiment, the backwash shower head may be directly attached to pool filter extension, thereby forming a linear extension from the filter in the direction of the dump site. In other embodiments, the shower head may be attached at an angle to the pool filter extension. For example, the backwash shower head may be connected to a backwash shower extension, which itself is connected to the pool filter extension, such as through an angled adapter, thereby forming an angled configuration (such as an L-shape) enabling formation of an upwardly arcing spray. Both the angle from horizontal (and the corresponding angle of arc) as well angle away from the pool filter may vary.

In some embodiments, the pool filter extension comprises a filter extender (e.g. a conduit) having an attached pool filter connector. Any connector appropriately sized for the backwash outlet of the pool filter may be used. For example, the pool filter connector may have a threaded end that can be screwed onto the backwash outlet and may have an opposing end sized to be secured, either temporarily or permanently, onto the filter extender.

Figure 2:
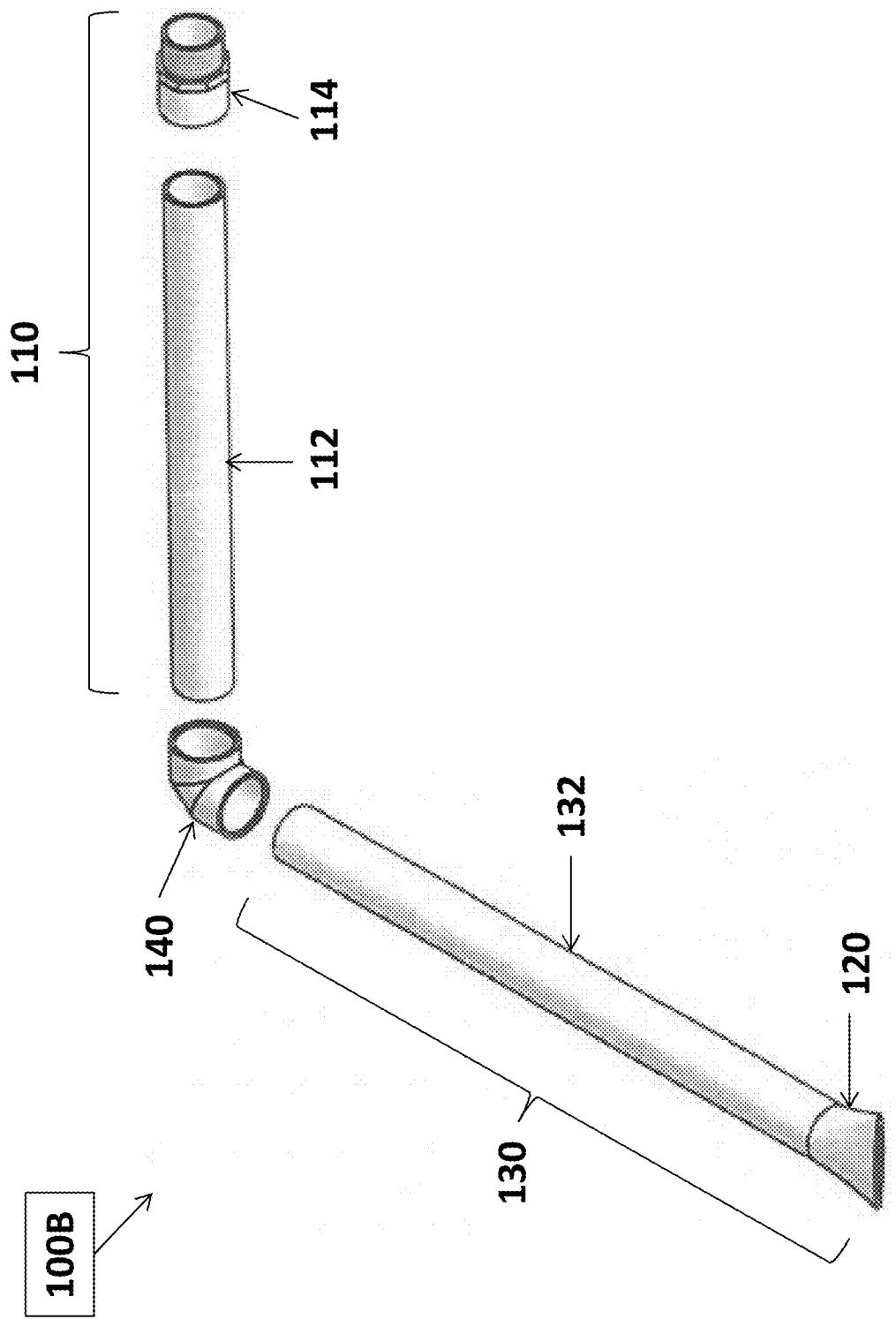
FIG. 2 shows an exploded view of an embodiment of the pool filter backwash assembly.

Specific embodiments and components of the pool filter backwash assembly of the present disclosure are shown in FIGS. 1-3 and discussed in more detail below. However, it should be apparent to those skilled in the art that these are merely illustrative in nature and not limiting, being presented by way of example only. Numerous modifications and other embodiments are within the scope of ordinary skill in the art and are contemplated as falling within the scope of the present disclosure. In addition, those skilled in the art should appreciate that the specific configurations are exemplary and that actual configurations will depend on the specific system. Those skilled in the art will also be able to recognize and identify equivalents to the specific elements shown, using no more than routine experimentation.

FIG. 1A and FIG. 1B show an overhead view of different specific embodiments of a pool filter backwash assembly of the present disclosure. As shown in FIG. 1A, pool filter backwash assembly 100A comprises pool filter extension 110 and backwash shower head 120. As shown, pool filter extension 110 includes filter extender 112 having one end attached to pool filter connector 114 and an opposing end attached to the backwash shower head. The pool filter connector is shown having threaded end 116, which may be any size (e.g., diameter) needed to enable secure connection to the backwash outlet of a pool filter.

Furthermore, in the specific embodiment of FIG. 1A, filter extender 112 is shown as substantially linear. For example, the filter extender may be a PVC conduit, such as is used in household plumbing, and any thickness and diameter PVC conduit may be used. Likewise, pool filter connector 114 and/or backwash shower head 120 may also be made of PVC, and, as such, attachment may be made permanent using PVC cement. However, temporary attachments may also be use, enabling, for example, the backwash shower head to be rotatable on the filter extension. Such types of connections will be known to those skilled in the art. In addition, other types of conduits may be used, enabling a bent or curved shape, such as an upwardly arcing conduit. In addition, the length and/or arc of filter extender 112 can also be varied as needed, for example, in order to extend the shower head to a desired distance from the pool filter location. That is, in some embodiments, the filter extender may be flexible and bendable. For the specific embodiment show in FIG. 1A, the filter extender is rigid and linear, having a length of from about 1 to about 25 feet, such as from about 5 to about 20 feet, including from about 10 to about 20 feet. Shorter lengths in general may have improved stability during use while longer extensions provide a better distance between the pool filter and the target dump site. In some embodiments, filter extender 112 may have a variable length (e.g., periscoping length) that is extendable (lengthened or shortened) as desired prior to, during, or after use (such as for storage).

FIG. 1B shows another embodiment of the pool filter backwash assembly of the present disclosure. In this specific embodiment, pool filter backwash assembly 100B comprises pool filter extension 110, backwash shower extension 130, and angled adapter 140. Similar to the embodiment shown in FIG. 1A, pool filter extension 110 comprises filter extender 112 having a first end attached to pool filter connector 114, and any of the pool filter extensions discussed above may be used. However, for this specific embodiment, the filter extender has an opposing end attached to angled adapter 140. In addition, backwash shower extension 130 comprises shower extender 132 having a first end attached to backwash shower head 120 and a second end attached angled adaptor 140. The shower extender may be similar to the filter extender and, as such, may be linear or curved, rigid or flexible, fixed in length or adjustable (e.g., periscoping length), and made of PVC or other materials, as desired. Also, the filter extender and shower extender may also be the same or different in length, depending, for example, on the location of the pool filter. For example, in the specific embodiment shown in FIG. 1B, both filter extender 112 and shower extender 132 are linear and rigid, provided strength and stability during use, and the shower extender is slightly longer than the filter extender. FIG. 2 is a perspective view of the embodiment of FIG. 1B, shown partly disassembled.

As shown in FIG. 1B, pool filter backwash assembly 100B has an overall bent or angled configuration, enabling a backwash flow exiting a backwash outlet of a pool filter to be directed, for example, both forward from and to the side of the pool filter. The angle formed from angled adaptor 140, angle A, may vary, depending, for example, on the direction for the desired dump site. For example, while generally angle A can range from 0° to 180°, in some embodiments, the angle of the angled adaptor is from about 30° to about 150°, such as from about 45° to about 135° and from about 60° to about 120°. In the specific embodiment shown, the angle is about 90°, giving the pool filter backwash assembly an overall L-shape. In some embodiments, the angle is fixed. However, the angle may also be adjustable, such as throughout the ranges described above. Angle adjustment may occur prior to use (such as when attaching to the pool filter), during use (such as to account for a change in wind direction), or after use (such as for storage). Angled adaptors providing adjustable angles will be known to those skilled in the art.

As shown, for both embodiments, the pool filter backwash assembly includes a pool filter connector configured to couple to the backwash outlet of a pool filter, thereby securing the assembly on the pool filter. A specific pool filter connector is shown in FIGS. 3A-3D, which are perspective, front, side, and back views respectively. As shown, pool filter connector 114 has a generally cylindrical shape with threaded end 116 configured to securely couple to the backwash outlet and opposing end 118 configured to attach to the filter extender (such as by insertion of the filter extender into the opposing end of the connector and fixing with an adhesive, particularly for a PVC connector). As shown, in some embodiments, the threaded end has a smaller outer diameter than the opposing end (e.g., a male connection to fit into a corresponding female backwash outlet), although other configurations are possible. In addition, pool filter connector 114 may include flange 119 by which the connector may be grasped and turned, such as with a wrench or by hand, to tighten and secure onto the backwash outlet. Suitable connectors will be known to one skilled in the art.

Figure 4D:
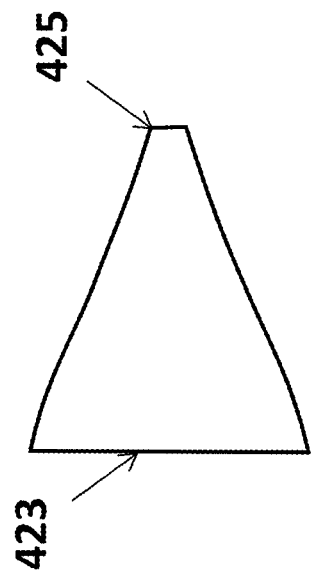
FIGS. 4A-4D show views of the backwash shower head used in various embodiments of the pool filter backwash assembly.
Figure 4C:
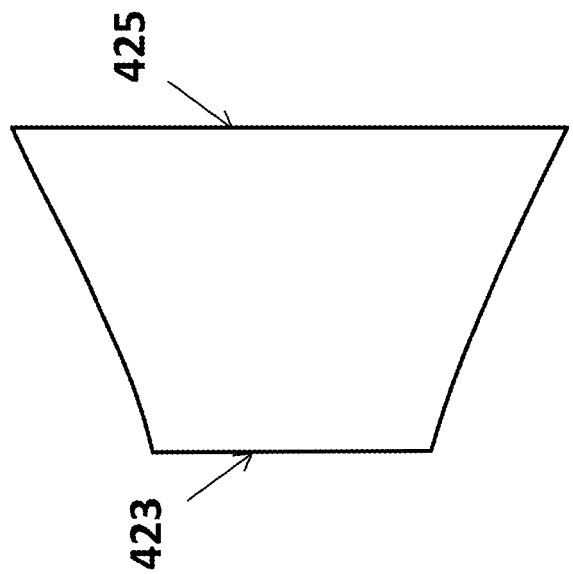
Figure 4B:
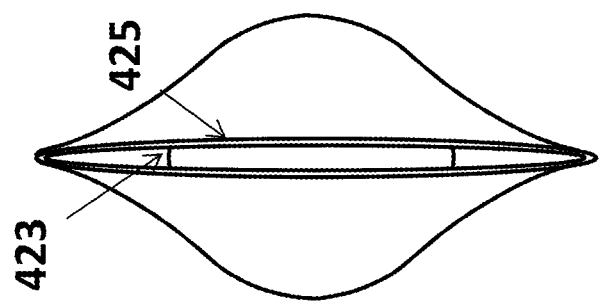
Figure 4A:
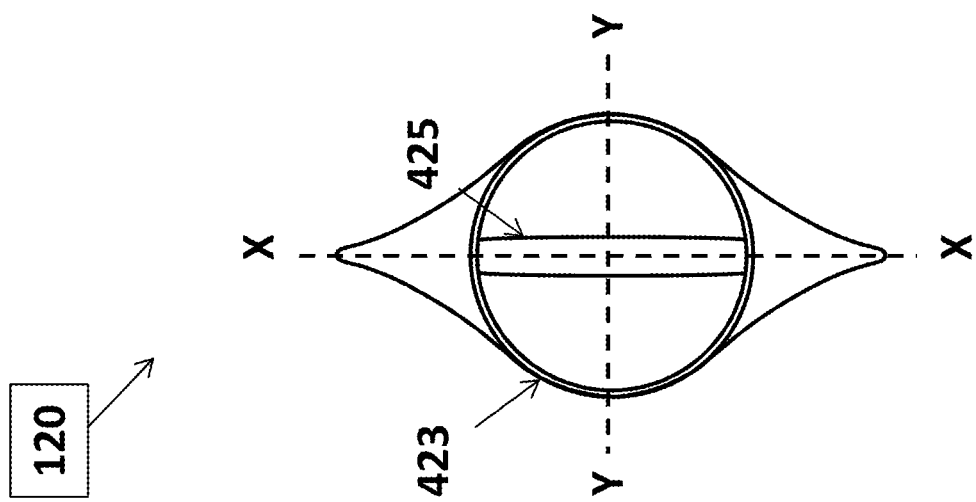
Figure 5A:
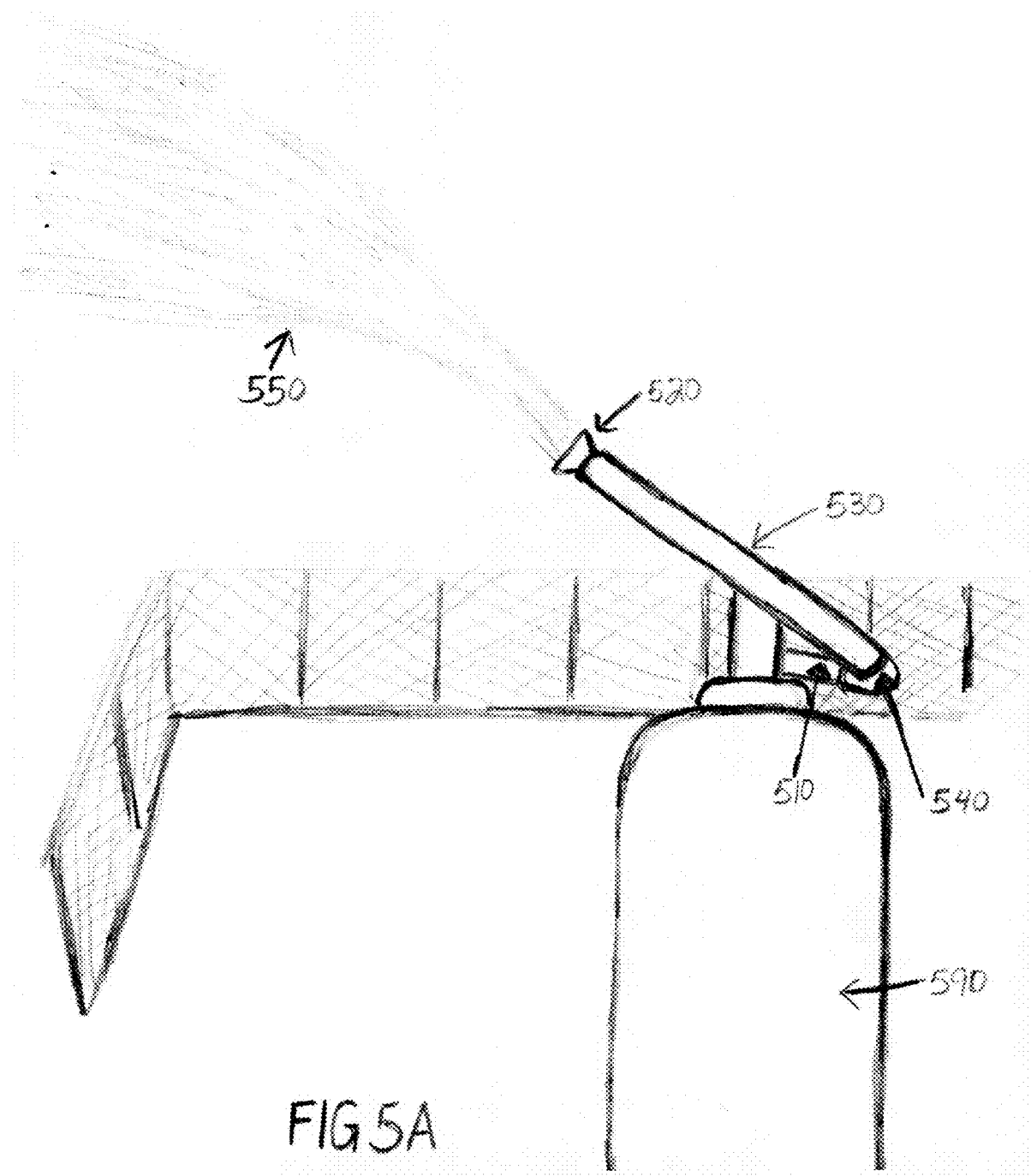
FIGS. 5A-5B show an example use of the pool filter backwash assembly.
Figure 5B:
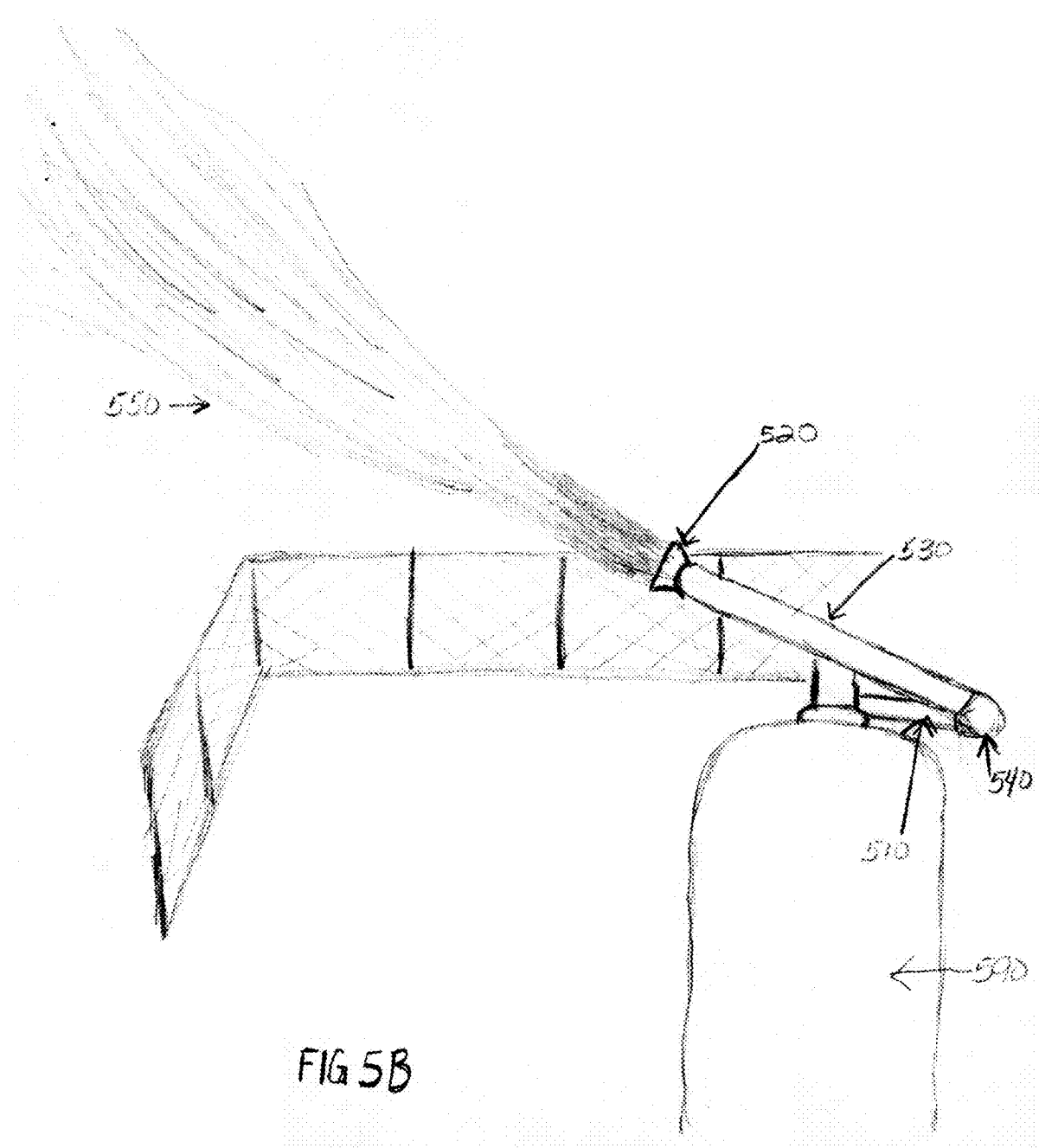

In addition, for both embodiments, the shower head (e.g., a spray diffuser), attached either to the filter extender as in FIG. 1A or to the shower extender as in FIG. 1B, is configured to convert the backwash waste flow exiting the pool filter through the backwash outlet, into an airborne spray. A specific embodiment of the shower head is shown in FIGS. 4A-4D, which are a back view, a front view, and two side cross-sectional views respectively. As shown, shower head 120 comprises conduit end 423 configured to connect to an extender conduit (e.g., the filter extender or the shower extender) and diffuser end 425 opposing the conduit end, configure to form a fluid spray. For example, conduit end 423 may have a circular cross sectional shape, as best seen in FIG. 4A, to fit over (e.g., female fitting) or within (e.g., male fitting) a correspondingly circular conduit. Diffuser end 425 may have a generally elliptical cross-sectional shape, having a width much smaller than its length (as best seen in FIG. 4B). Other shapes are also possible, such as a rounded rectangular shape or an oval or circular shape, depending, for example, on the desired type of spray to be produced.

Also, in general, the shower head has an overall shape that changes in size from the conduit end to the diffuser end, changing the flow from the pool filter and creating a spray. For example, in the embodiment shown in FIG. 4A-4D, shower head 120 may have a generally overall trapezoidal shape, fanning out and increasing in size from conduit end 423 towards diffuser end 425 in one direction (e.g., along the wide end of the ellipsoidal diffuser end), as best seen in FIG. 4C, which is a cross-section taken along direction X-X in FIG. 4A, and tapering down and decreasing in size towards the diffuser end in the perpendicular direction (e.g., along the narrow end of the ellipsoidal diffuser end), as best seen in FIG. 4D, which is a cross-section taken along direction Y-Y in FIG. 4A. Thus, as shown, the diffuser end may have an elliptical shape with a first diameter (e.g., in the direction X-X in FIG. 4A) that is greater than the diameter of the conduit end and a second diameter (e.g. in the direction Y-Y in FIG. 4A, which is perpendicular to the direction X-X) that is less than the diameter of the conduit end. In this way, a flow of waste water pumped under pressure from the backwash outlet of a pool filter will be converted into a spray when exiting the diffuser end of the shower head.

Shower head 120 may be formed using a variety of different methods, in order to provide the desired fanning overall shape. For example, in one embodiment, a cylindrical piece of conduit, such as a short section of a PVC pipe, may be heated at one end and compressed or otherwise deformed to reshape the circular profile into the ellipsoidal profile of the diffuser end. Other techniques, such as extrusion, injection molding, or other forming methods, can also be used, as will be known to one skilled in the art.

Furthermore, the diffuser end of the shower head may further include gratings (e.g., partitioned openings) to produce a lower density, more diffuse spray. In some embodiments, partially hindering the flow out of the shower head may provide a more powerful spray, increasing the distance towards the targeted dump site. However, thinner gratings and wider openings may be preferred, in some embodiments, in order to allow solid materials (e.g., leaves, sand, bugs, etc.) in the backwash flow to exit the shower head and avoid a potential pressure buildup within the pool filter backwash assembly.

In some embodiments, various connections between components may be able to be rotated. For example, as discussed above, the shower head may be rotatably attached to the filter extender or shower extender. In this way, the directionality of the spray may be changed as needed during use. In some embodiments, the shower head may be fixedly attached to the shower extender, and the connection of the shower extender to the angled adaptor may be rotatable. Also, in some embodiments, connections along the filter extender (e.g., between the filter extender and the angled adaptor and/or between the filter extender and the filter connector) may be rotatable. This would enable the height and distance of the spray arc to be changed as needed to spray the backwash flow at the desired target dump area. For example, the spray may be directed away from the pool filter at an angle of from about 10° to about 80° from horizontal, including, from about 20° to about 70° and from 30° to about 60° from horizontal.

FIGS. 5A-5B show views of an embodiment of the pool filter backwash assembly, such as pool filter backwash assembly 100B shown in FIG. 1B, attached to a pool filter. In operation, during backwash, based on the angle of shower head 520, the angle of backwash shower extension 530 relative to horizontal, and the angle of angled adaptor 540, spray 550 may be formed as a gentle arc from the high pressure backwash waste stream exiting pool filter 590. The length of backwash shower extension 530 (e.g., the length of the shower extender to which the shower head and angled adaptor are attached) and the length of pool filter extension 510 (e.g., the length of the filter extender to which the angled adaptor and pool filter connector are attached) provide a convenient distance between the arcing spray and the pool filter, enabling a user to operate the filter backwash mechanism without getting wet.

FIG. 6 illustrates an example simplified procedure for backwashing a pool filter, in accordance with the embodiments herein. In general, procedure 600 may be performed by a user positioned beside the pool filter. Procedure 600 may start at step 605 and continues on to step 610 where, as described in greater detail above, a pool filter backwash assembly is attached to a backwash outlet of the pool filter. Any of the assemblies described above may be used. In some embodiments, the pool filter backwash assembly may comprise a pool filter extension including a filter extender having a first end attached to a pool filter connector sized for the backwash outlet and a second end attached to a backwash shower head. In some embodiments, the pool filter backwash assembly may comprise a pool filter extension comprising a filter extender having a first end attached to a pool filter connector sized for the backwash outlet and a second end attached to an angled adapter and a backwash shower extension comprising a shower extender having a first end attached to a backwash shower head and a second end attached to the angled adapter.

In step 615, as described in greater detail above, a backwash stream is formed from the backwash outlet of the pool filter. Formation of the backwash waste stream can vary depending on the type of filter pump of the pool filter. Often, this is accomplished by repositioning a valve in order to reverse the flow of water through the filter. For example, under normal operation, the pump of the pool filter moves water from the pool through from the pool filter region, which is generally filled with sand, and back out into the pool. Formation of a backwash stream may occur by pumping the pool water in the reverse direction through the pool filter region, removing contaminants capture by the filter, to exit through the backwash outlet.

In step 620, as described in greater detail above, the backwash stream from the backwash outlet of the pool filter is converted into a spray. The formed backwash stream may be pumped by the pool filter pump through the pool filter backwash assembly as a high pressure flow, which may then be diverted by the assembly to exit out in a direction away from the pool filter. Furthermore, the backwash stream (e.g., a high pressure waste flow) is converted into a spray, which may be produced by the backwash shower head of the pool filter backwash assembly. In some embodiments, the direction of the spray may be changed prior to or during use. In this way, when the pool filter is set to backwash, the resulting waste water stream forced under pressure through the pool filter backwash assembly is dispersed gently as a water spray substantially evenly over a designated area of an owner's property, which significantly reduces and/or eliminate damage to the property and surrounding area (e.g., flooding, erosion, hole formation, etc.). Procedure 600 then ends at step 625.

Figure 6:
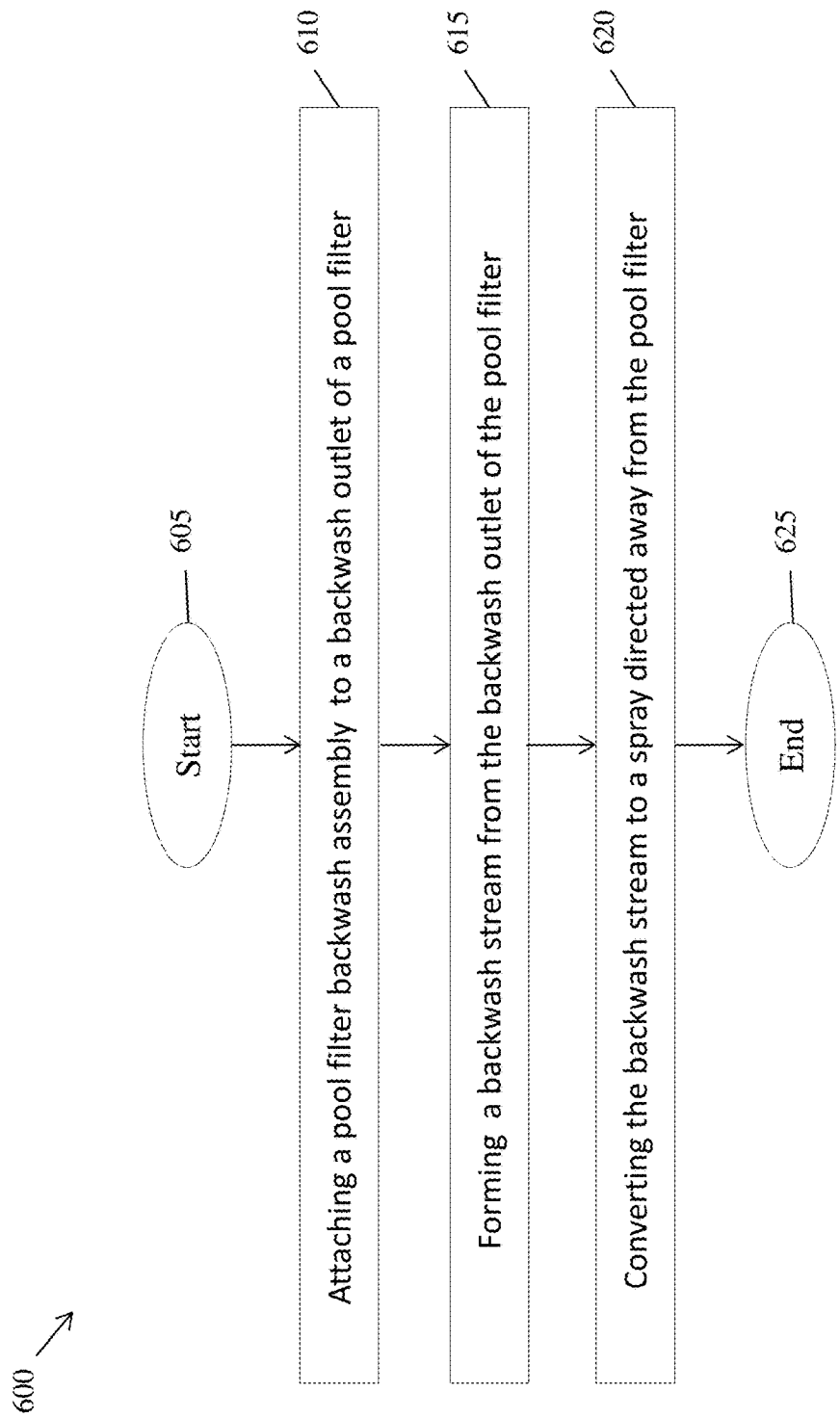
FIG. 6 shows an example simplified procedure for backwashing a filter using embodiments of the pool filter backwash assembly.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

As will be appreciated, the above examples are intended only for the understanding of certain aspects of the techniques herein and are not limiting in nature. For example, while the techniques are described primarily with respect to a particular pool filter backwash assembly, the disclosed techniques may be performed with additional or modified components according to further implementations. In addition, while the techniques herein are described primarily with respect to pool filter waste streams, the techniques herein are not limited as such and can be adapted for use in other industries, as well.

Thus, while the foregoing description has been directed to specific embodiments, it will be apparent, however, that other variations and modifications may be made to the described embodiments, with the attainment of some or all of their advantages. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A swimming pool filtration system having a filtration media that periodically requires backwashing, with a resultant backwash stream being discharged through a backwash outlet of said swimming pool filtration system, the swimming pool filtration system including a backwash assembly comprising:
   a pool filter extension including a filter extender 112 having a first end attached to a pool filter connector 114 sized for the backwash outlet for connection to said backwash outlet; and
   a backwash shower head 120 connected to a second end of said filter extender for converting said backwash stream from the backwash outlet to a spray directed away from the pool filtration system.

2. The swimming pool filtration system of claim 1 further comprising a backwash shower extension 130 and an angled adapter 140 fluidically interposed between said filter extender 112 and said backwash shower head 120.

3. The swimming pool filtration system of claim 2, wherein the backwash shower extension comprises a shower extender having a first end attached to the backwash shower head and a second end attached to the angled adapter.

4. The swimming pool filtration system of claim 3, wherein the shower extender is rotatably attached to the angled adapter.

5. The swimming pool filtration system of claim 2, wherein the angled adapter is rotatably attached to the filter extender.

6. The swimming pool filtration system of claim 2, wherein the angled adaptor has an angle of from about 45° to about 135°.

7. The swimming pool filtration system of claim 2, wherein the angled adaptor has an adjustable angle.

8. The swimming pool filtration system of claim 1, wherein the backwash shower head is rotatable.

9. The swimming pool filtration system of claim 1, wherein the backwash shower head is rotatably attached to the second end of the filter extender.

10. The swimming pool filtration system of claim 1, wherein the filter extender has length that is variably extendable.

11. The swimming pool filtration system of claim 1, wherein the shower head further comprises a grating.

12. The swimming pool filtration system of claim 1, wherein the spray is directed away from the swimming pool filtration system at an angle of from about 10° to about 80° from horizontal.

13. The swimming pool filtration system of claim 1, wherein the backwash shower head comprises a conduit end having a circular cross-sectional shape with a diameter sized to attach to the shower extender and a diffuser end shaped to form the spray.

14. The swimming pool filtration system of claim 13, wherein the diffuser end has a substantially elliptical cross-sectional shape with a first diameter greater than the diameter of the conduit end of the diffuser and a second diameter, perpendicular to the first diameter, less than the diameter of the conduit end of the diffuser.

15. The swimming pool filtration system of claim 1, wherein the components of the backwash assembly are fabricated from polyvinyl chloride or PVC.

\* \* \* \* \*